United States Patent
Codrescu et al.

(10) Patent No.: US 7,526,633 B2
(45) Date of Patent: Apr. 28, 2009

(54) METHOD AND SYSTEM FOR ENCODING VARIABLE LENGTH PACKETS WITH VARIABLE INSTRUCTION SIZES

(75) Inventors: Lucian Codrescu, Austin, TX (US);
Erich Plondke, Austin, TX (US);
Muhammad Ahmed, Austin, TX (US);
William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/088,607

(22) Filed: Mar. 23, 2005

(65) Prior Publication Data

US 2006/0218379 A1 Sep. 28, 2006

(51) Int. Cl.
*G06F 9/30* (2006.01)
*G06F 15/00* (2006.01)

(52) U.S. Cl. ...................................... 712/210; 712/209
(58) Field of Classification Search ................. 712/209, 712/210
See application file for complete search history.

(56) References Cited

U.S. PATENT DOCUMENTS

| | | | | |
|---|---|---|---|---|
| 5,475,853 A | * | 12/1995 | Blaner et al. | 712/213 |
| 5,500,942 A | * | 3/1996 | Eickemeyer et al. | 712/210 |
| 5,634,025 A | * | 5/1997 | Breternitz, Jr. | 712/207 |
| 5,774,737 A | * | 6/1998 | Nakano | 712/24 |
| 5,819,058 A | * | 10/1998 | Miller et al. | 712/210 |
| 5,881,260 A | * | 3/1999 | Raje et al. | 712/210 |
| 5,951,674 A | * | 9/1999 | Moreno | 712/210 |
| 6,101,592 A | * | 8/2000 | Pechanek et al. | 712/20 |
| 6,115,806 A | * | 9/2000 | Yoshida | 712/210 |
| 6,260,134 B1 | * | 7/2001 | Zuraski et al. | 712/210 |
| 6,366,998 B1 | * | 4/2002 | Mohamed | 712/17 |
| 6,397,323 B1 | * | 5/2002 | Yoshida | 712/212 |
| 6,463,520 B1 | | 10/2002 | Otani | |
| 2002/0056035 A1 | * | 5/2002 | Rozenshein et al. | 712/208 |
| 2002/0144088 A1 | * | 10/2002 | Mohamed et al. | 712/210 |
| 2003/0225998 A1 | * | 12/2003 | Khan et al. | 712/210 |

* cited by examiner

*Primary Examiner*—Eddie P Chan
*Assistant Examiner*—Idriss N Alrobaye
(74) *Attorney, Agent, or Firm*—Joseph B. Agusta; Nicholas J. Pauley; Thomas R. Rouse

(57) ABSTRACT

Techniques for processing transmissions in a communications (e.g., CDMA) system. The method and system encode and process instructions of mixed lengths (e.g., 16 bits and 32 bits) and instruction packets including instructions of mixed lengths. This includes encoding a plurality of instructions of a first length and a plurality of instructions of a second length. The method and system encode a header having at least one instruction length bit. The instruction bit distinguishes between instructions of the first length and instructions of the second length for an associated DSP to process in a mixed stream. The method and system distinguish between the instructions of the first length and the instructions of the second length according to the contents of the instruction length bits. The header further includes bits for distinguishing between instructions of varying lengths in an instruction packet.

12 Claims, 4 Drawing Sheets

METHOD AND SYSTEM FOR ENCODING VARIABLE LENGTH PACKETS WITH VARIABLE INSTRUCTION SIZES

FIELD

The disclosed subject matter relates to data communications. More particularly, this disclosure relates to a novel and improved method and system for encoding variable length packets with variable instruction sizes.

DESCRIPTION OF THE RELATED ART

A modern day communications system must support a variety of applications. One such communications system is a code division multiple access (CDMA) system that supports voice and data communication between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "3$^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard.

Digital signal processors (DSPs) are frequently being used in wireless handsets complying with the above standards. In particular, wireless handsets are requiring and increasingly will require that their DSP process user orientation, scientific, and multimedia applications, as well as many other types of applications for which a single approach to multithreaded operations provides a workable solution. Moreover, the resource requirements may change widely and dynamically for applications such as television broadcasts, streaming message tickers, electronic mail (including messages with attached documents), as well as resident applications, such as photography and PDA applications, all from the same DSP.

One significant problem to solve in such DSPs is to delineate the instruction size for the instructions that DSP must execute. On the one hand high performance demands instructions to be of a large size, e.g., 32-bits or more in length. On the other hand, there is the need for small code size, e.g., 16-bits in length. In order to achieve small code size, there is the need to have a mix of short 16-bit instructions and large 32-bit instructions. The VLIW (Very Long Instruction Word) class of DSP machines also encodes groups of instructions to determine which instructions may be executed in parallel. Achieving an understanding of which instructions may be processed in parallel requires both a delineation of the instruction size (i.e., 16-bit or 32-bit instructions) as well as the packet size (i.e., which instructions are group together to form a particular packet). When there are mixed instruction sizes, the machine must delineate quickly which instructions are 16-bit instructions and which are 32-bit instructions. If this is difficult to determine, a number of other problems arise in DSP operation.

One classical approach to determining instruction size is known as instruction serialization. In such schemes, it is necessary to determine serially the size of each instruction. Thus, in order to determine the size of any instruction, it is necessary to know the size of the all preceding instructions. If there are many instructions, the requirement to determine serially the size of all preceding instructions can be limiting. Accordingly, a need exists for a method and system that allows for parsing of instructions in a manner other than serially, for distinguishing between 16-bit and 32-bit instructions.

Another problem with instruction size delineation has to do with packet delineation. Packet delineation involves using a number of instructions in parallel. The challenge is to delineate which instructions to group together. In one known DSP architecture, for example, all instructions are of 32-bit length. In such an architecture, there is no need to delineate size differences. There is, however, the need to delineate the association of instructions in packets. This permits determining which packets are grouped together for execution as an instruction packet. Presently, however, no known way exists to rapidly and efficiently delineate packet sizes for DSPs using mixed instructions. Accordingly, a further need exists for a method and system for delineating packet sizes in DSPs executing instruction packets of varying lengths that may include variable length instructions.

A further need exists for a method and system that not only avoids the problems associated with serially determining the size of mixed length instructions, but also provides for efficient packet delineation in a DSP capable of supporting many different wireless handset applications.

SUMMARY

Techniques for encoding variable length instructions and packets with variable instruction sizes are disclosed, which techniques improve both the operation of a digital signal processor and the efficient use of digital signal processor instructions for processing increasingly robust software applications for personal computers, personal digital assistants, wireless handsets, and similar electronic devices, as well as increasing the associated digital processor speed and service quality.

According to one aspect of the disclosed subject matter, there is provided a method and a system for encoding and processing instructions and packets of instructions of mixed lengths (e.g., 16 bits and 32 bits). The method includes the steps of and the system includes the structures for encoding a plurality of instructions of a first length (e.g., 16 bits) and a plurality of instructions of a second length (e.g., 32 bits). The method and system encode a header having at least one instruction length bit. The instruction bit distinguishes between the instructions of the first length and the instructions of the second length. The DSP processes the instructions in a mixed stream of instructions of the first length and the instructions of the second length. The method and system distinguish between each of the instructions of the first length and the instructions of the second length according to the contents of the instruction length bits.

The disclosed subject matter further includes in the header predetermined bits for designating the instructions in a packet. Thus, by including such functional bits in the header, the method and system can specify or distinguish between instructions of varying lengths as well as the number of such instructions in an instruction packet. As such, here appears a method and system that not only avoids the problems associated with serially determining the size of mixed length instructions, but also provides for efficient packet delineation in a DSP capable of supporting many different wireless handset applications.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

Figure 3:
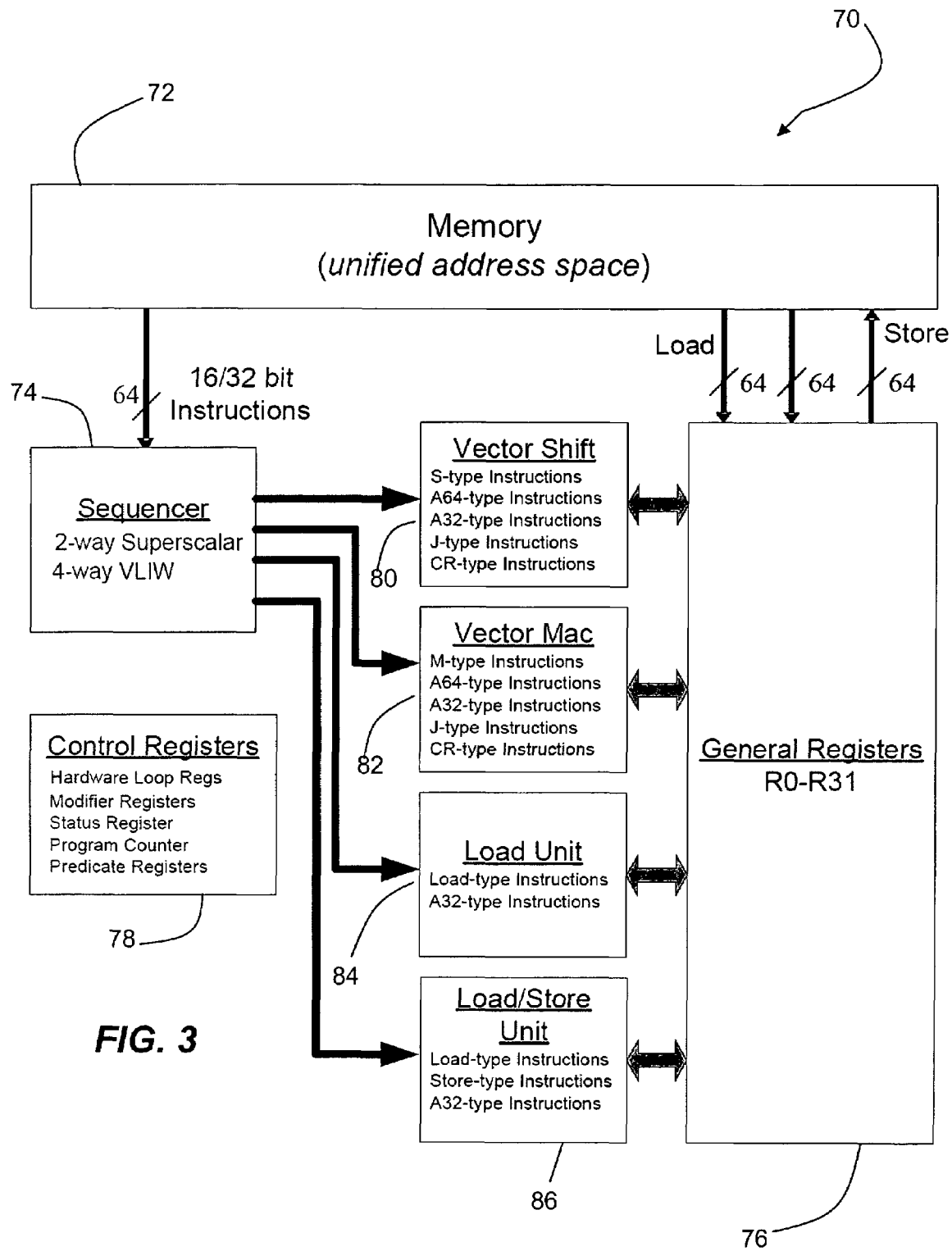
Figure 4:
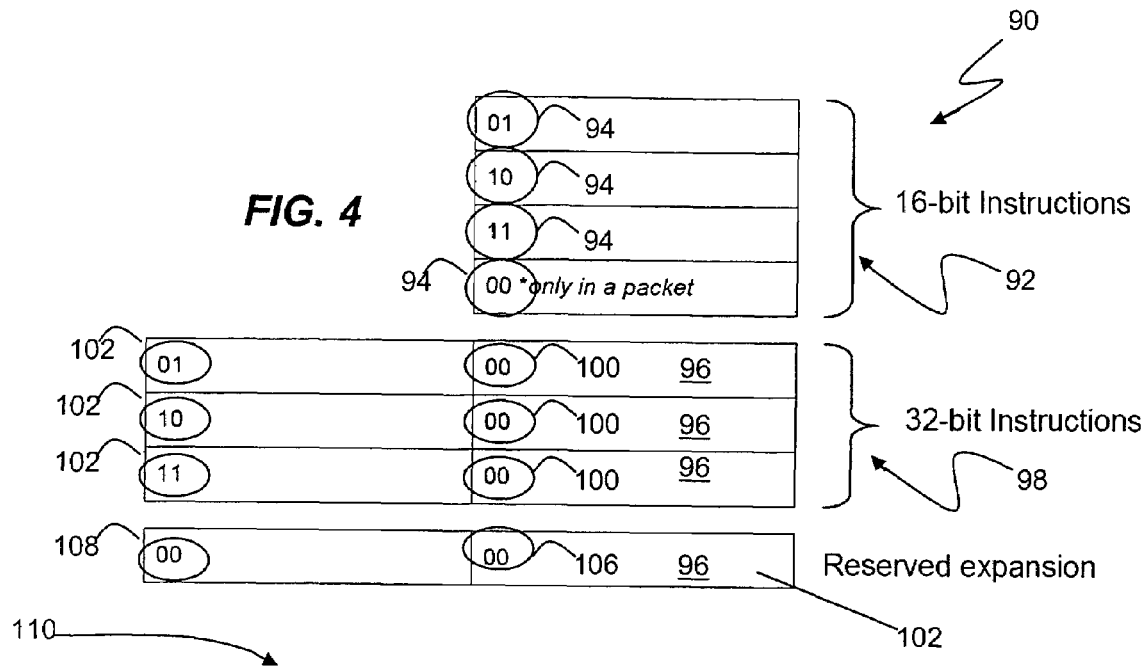
Figure 5:
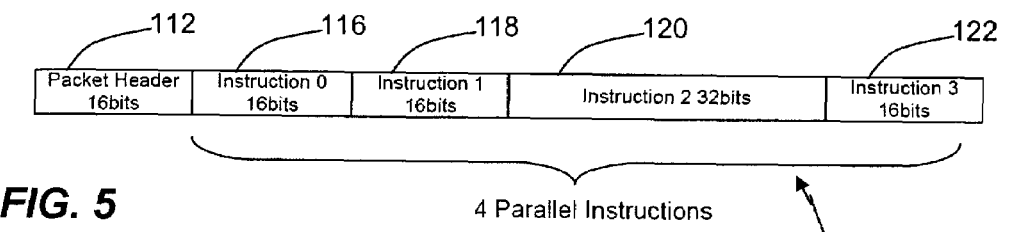
Figure 6:
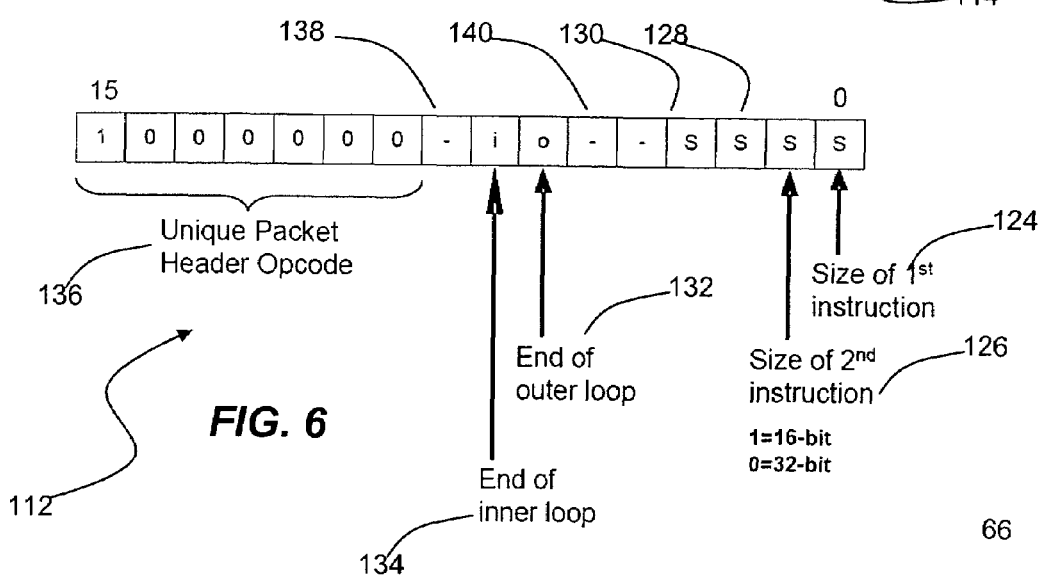

FIG. 3 provides an architecture block diagram of one embodiment of a programming model for a single DSP thread;

FIG. 4 illustrates an instruction size parsing diagram for the present embodiment;

FIG. 5 shows a packet that includes a packet header according to the disclosed subject matter; and FIG. 6 depicts in further detail packet header encoding for one embodiment of the disclosed subject matter.

DETAILED DESCRIPTION OF THE SPECIFIC EMBODIMENTS

Figure 1:
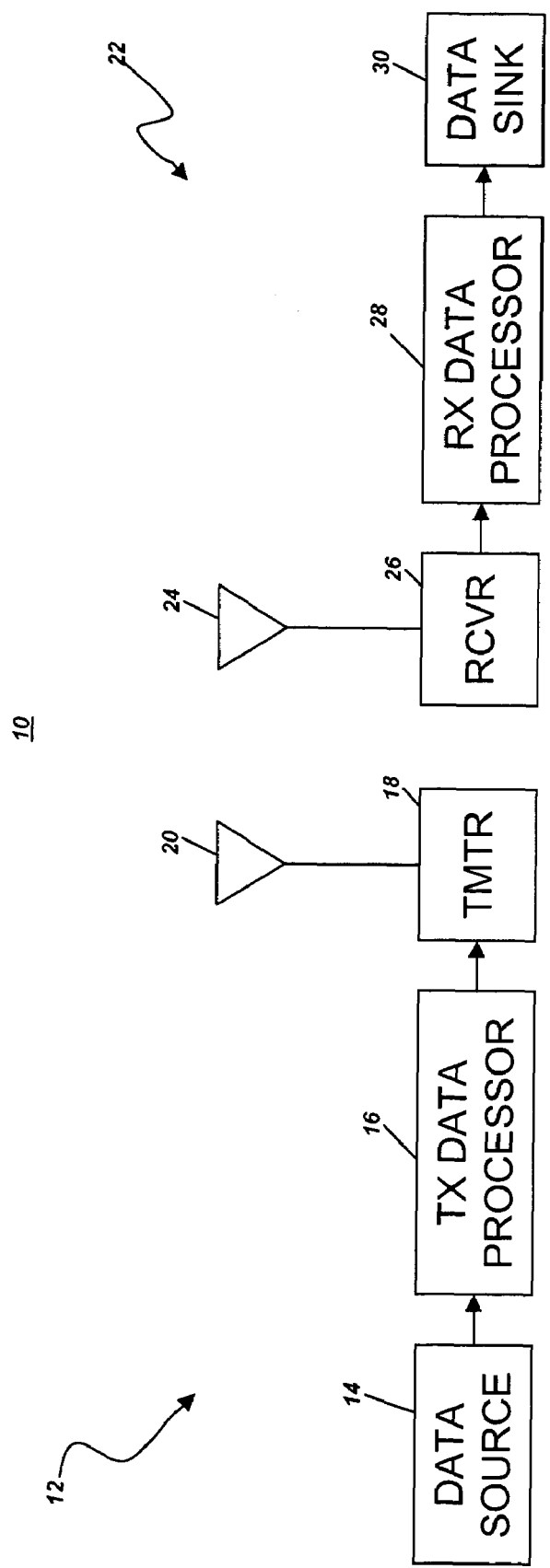
FIG. 1 is a simplified block diagram of a communications system that can implement the present embodiment.

FIG. 1 is a simplified block diagram of a communications system 10 that can implement the presented embodiments. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
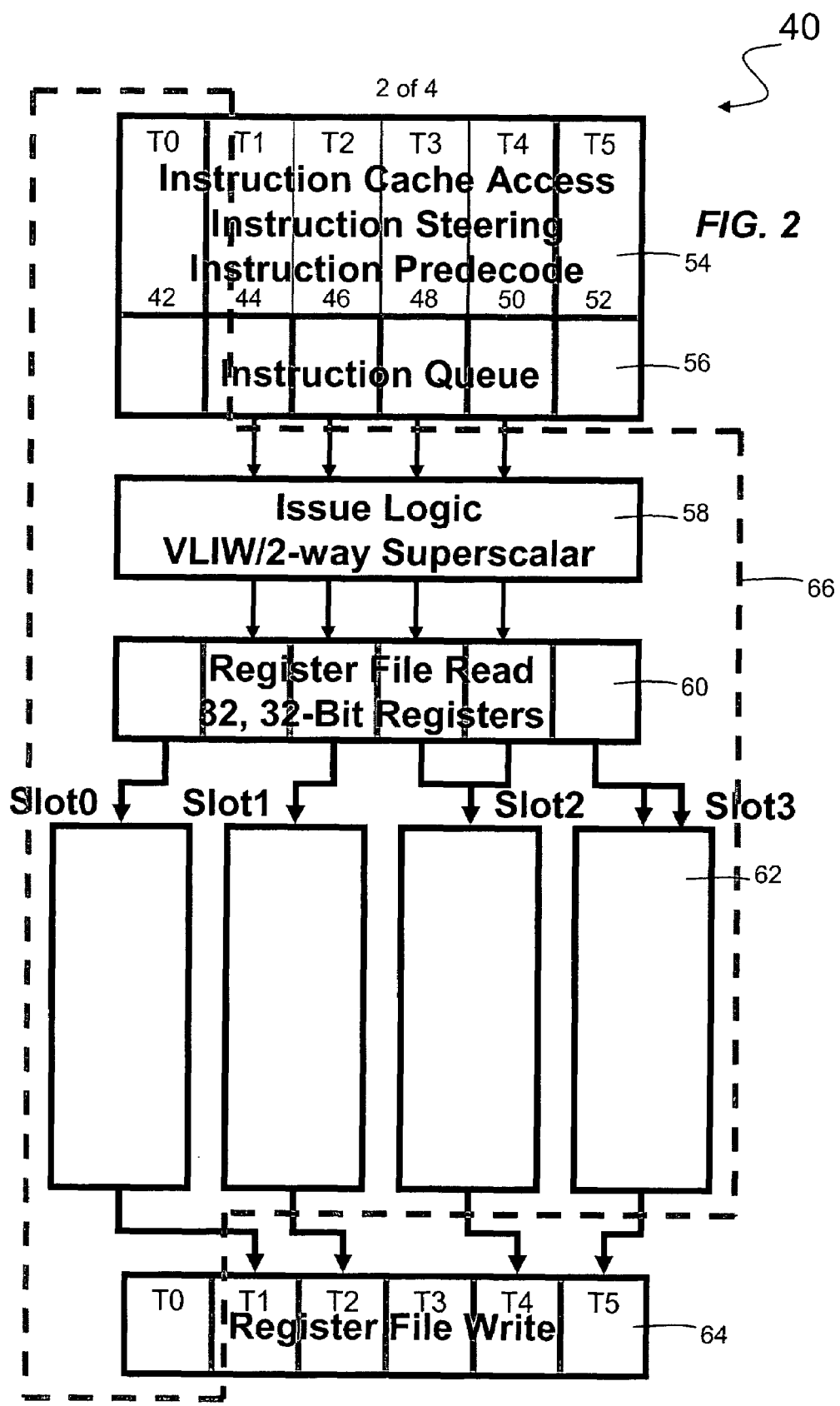
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. Recognize that DSP 40 only represents one embodiment among a great many of possible digital signal processor embodiments that may effectively use the teachings and concepts here presented. In DSP 40, therefore, threads T0 through T5 (reference numerals 42 through 52), contain sets of instructions from different threads. Circuit 54 represents the instruction access mechanism and is used for fetching instructions for threads T0 through T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of selected thread is read and read data is sent to execution data paths 62 for SLOT0 through SLOT3. Slot0 through SLOT3, in this example, provide for the packet grouping combination employed in the present embodiment.

Output from execution data paths 62 goes to register file write circuit 64, also configured to accommodate individual threads T0 through T5, for returning the results from the operations of DSP 40. Thus, the data path from circuit 54 and before to register file write circuit 64 being portioned according to the various threads forms a processing pipeline 66.

The present embodiment may employ a hybrid of a heterogeneous element processor (HEP) system using a single microprocessor with up to six threads, T0 through T5. Processor pipeline 66 has six stages, matching the minimum number of processor cycles necessary to fetch a data item from circuit 54 to registers 60 and 64. DSP 40 concurrently executes instructions of different threads T0 through T5 within a processor pipeline 66. That is, DSP 40 provides six independent program counters, an internal tagging mechanism to distinguish instructions of threads T0 through T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including key aspects of the associated instruction set architecture for one manifestation of the disclosed subject matter. Implementations of the DSP 40 architecture support interleaved multithreading (IMT). In this execution model, the hardware supports concurrent execution of multiple hardware threads T0 through T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. Patent Applications by M. Ahmed, et al, and entitled "*Variable Interleaved Multithreaded Processor Method and Sys-* tem" and "*Method and System for Variable Thread Allocation and Switching in a Multithreaded Processor.*"

The subject matter here disclosed deals with the execution model of a single thread. The software model of IMT can be thought of as a shared memory multiprocessor. A single thread sees a complete uni-processor DSP 40 with all registers and instructions available. Through coherent shared memory facilities, this thread is able to communicate and synchronize with other threads. Whether these other threads are running on the same processor or another processor is largely transparent to user-level software.

FIG. 3, therefore, provides an architecture block diagram of one embodiment of a programming model for a single thread. FIG. 3 shows one embodiment of a block diagram for instruction set architectural (ISA) 70 of DSP 40, which includes unified byte-addressable memory 72. Memory 72 provides mixed 16-bit and 32-bit instructions to sequencer 74. Memory 72 may include a computer usable medium having computer readable program code for proccessing the 16-bit and 32-bit instructions on DSP 40. There are two register files, including general register 76 and control register 78. Sequencer 74 provides hybrid two-way superscaler instructions and four-way VLIW instructions to vector shift unit 80, vector MAC unit 82, load unit 84, and load/store unit 86. The DSP 40 architecture, therefore, features a unified memory 72 and a single unified register file. Mixed 16- and 32-bit instructions can be issued in parrallel, up to four at a time, in one embodiment. ISA 70, furthermore, supports moving two 64-bit double words from memory to registers each cycle.

Memory 72, general register 76, and control register 78 of DSP 40 support a single 32-bit address space that holds both instructions and data operating in little endian mode. General register 76 holds thirty-two 32-bit registers which can be accessed as single registers, or as aligned 64-bit pairs. General register 76 holds all pointer, scalar, vector, and accumulator data and provides flexibility for service as a compiler target. Control register 78 holds special-purpose registers such as program counter, status register.

ISA 70 features a hybrid execution model that mixes the advantages of superscalar and VLIW execution. Superscalar issue has the advantage that no software information is needed to find independent instructions. There is no added code size or encoding inefficiencies to provide multi-issue execution. Additionally, superscalar issue can find parallel instructions over branch boundaries which can be difficult for a compiler. However, superscalar issue becomes expensive in hardware beyond dual issue.

The advantage of the VLIW execution is that the software may identify many more than two instructions for parallel execution, especially in software pipelined loops which are typical of DSP code. VLIW is an inexpensive way to provide wide issue capability. ISA 70, therefore, combines the strengths of both execution models by creating a hybrid model. The execution model of ISA 70 communicates VLIW packet information for packets of three or more instructions. For parallelism of one and two instructions, ISA 70 is responsible for multi-instruction execution via dual superscalar issue. In this way, the architecture and associated microarchitecture can deliver wide issue parallelism with a minimal code size penalty. Parallelism over branch boundaries in control code can also be exploited.

As described in further detail below, instructions are encoded using either 16-bit instructions or 32-bit instructions. The two instruction sizes can be freely mixed in a program. These mixed size instructions can be packetized in groups for parallel execution. The packets may be of variable size. The 16-bit instruction set is chosen to carefully match the needs of a compiler generating dense control code.

ISA 70, furthermore, combines a RISC-like scalar instruction set which provides excellent support to the compiler and a DSP-oriented instruction set which provides a rich set of operations for signal processing applications. Within DSP 40, ISA 70 code is upwards binary compatible. This means that binaries written for a low-end implementation will run untouched on a high-end implementation. DSP 40, using ISA 70, specifically supports following classes of applications: (1) communications signal-processing (e.g., modems); (2) video processing (e.g., H.264 format); (3) image processing; (4) audio processing; (5) 3-D graphics front-end software; and (6) supporting control code, protocol stacks, RTOS, etc.

With the disclosed subject matter, instruction encoding includes a binary encoding scheme for instructions and packets of grouped instructions. FIG. 4 illustrates instruction size parsing diagram 90 for the present embodiment. In particular, 16-bit halfwords 92 include most significant bits 94, which serve as instruction length bits for indicating the length of halfwords 92. Thus, with values of "01," "10," "11," halfwords 92 are identified to be 16 bits in length. Note, also, that if a halfword 92 is in a packet (described below) and instruction length bits 94 have the "00" value, then the length could be 16 bits in this implementation. Alternatively, if the 16-bit halfword is not in a packet and the instruction length bit has the value "00," then the instruction length is 32 bits. This is shown in 16-bit halfwords 96, which are part of 32-bit instructions 98. In particular, 32-bit instructions 98, after instruction length bits 100, which all have values of "00," all instruction bits 102 have values of "01," "10," and "11". Moreover, in the illustrated embodiment, the 32-bit instruction 102 instruction bits 106 of value "00" and instruction bits 108 of value "00." The most significant bits of this 32-bit instruction 104 may include uses other than for length designation, for example.

In order to achieve optimal code density, ISA 70 supports mixed 16-bit instructions 92 and 32-bit instructions 98. These instructions can be freely mixed together and can optionally be grouped together in packets for parallel execution. The 16-bit instructions 92 have access to a restricted set of registers and only the most frequent opcodes are available in 16-bit format. The 16-bit instructions 92 are typically available in two-operand source destructive format. The instructions chosen for 16-bit formation are based on the statistically most frequent instructions from compiled code.

The two most significant bits (MSBs) of each 16-bit halfword 92 and 96, therefore, indicate the end of the instruction. Most 16-bit instructions 92 are subset versions of 32-bit instructions 98. For example, in one embodiment, a 16-bit ADD immediate instruction has a shorter immediate and a more limited register range then the equivalent 32-bit ADD instruction. A certain class of 16-bit instructions 92 are available only inside a packet. These instructions are always subset versions of equivalent 32-bit instructions 98. The 32-bit instructions 98 may be used inside or outside of a packet. These 32-bit instructions 98 are chosen to be the common instructions found inside packets. The 32-bit instructions 98 have access to all register resources and all opcodes and are presented in three-operand non-source destructive format.

With the present embodiment, instructions 92 and 98 may be grouped together to form packets 110 (FIG. 5) of independent instructions to be executed together and in parallel. How many and what type of instructions 92 and 98 may be grouped together is an architectural option that may depend, for example, on the particular implementation. For example, one version of DSP 40 supports up to four instructions grouped in a packet.

FIG. 5 shows packet 110 to include packet header 112 associating with four parallel instructions 114. Parallel instructions 114 include instruction 0 of 16 bits 116, instruction 1 of 16 bits 118, instruction 2 of 32 bits 120, and instruction 3 of 16 bits 122. Encoding of parallel instruction packets 110 in the present embodiment includes grouping of instructions into packets 110 of independent work. ISA 70 guarantees that all instructions in a group can be executed in parallel. Packets 110 are formed by pre-pending the independent instructions with packet header 112 which includes information about packet 110. Packet header 112 is encoded as a 16-bit instruction. Architecturally grouped packet 110, in the presented example, encodes four instructions. In the case there are less than four grouped instructions, a NOP instruction may be used in the unused slot.

There may be various rules for and restrictions on what types of instructions to group together and in what order they should appear in packets 110. In general, packets 110 should be concerned with resource constraints, dependency constraints, and ordering constraints. Moreover, packets 110 may be defined to have parallel execution semantics. This means that the execution behavior of a packet 110 may be as follows: first, all instructions in the packet 110 may read their source registers in parallel; next, all instructions in the packet may execute in parallel; finally, all instructions in the packet may write their destination registers in parallel.

Consistent with the present disclosure, packets and single instructions may be freely mixed in code. A packet 110 should be considered as an atomic unit, in essence a large "instruction," in the present embodiment. Similar to individual instructions, a packet 110 may execute to completion or not at all, i.e., a packet preferably never partially completes execution. If a packet causes a memory exception, for example, then the present embodiment establishes an exception point before the packet. Packets 110 may have a single PC address which is the address of the start of the packet. Preferably, it is illegal to branch into the middle of a packet 110. Architecturally, packets 110 or single instructions 92 and 98 may execute to completion including updating all registers and memory before the next packet or instruction begins.

FIG. 6 depicts, in further detail, packet header 112 encoding for one embodiment of the disclosed subject matter. In particular, of the 16 bits for packet header 112, least significant bits 124, 126, 128, and 130 relate, respectively and referring to FIG. 5, to the size of the instruction 0 116, instruction 1 118, instruction 2 120, and instruction 3 122. Packet header 112 further includes outer loop bit 132 and inner loop bit 134, as well as packet header opcode 136.

Packet header 112, as can be seen, provides a unique 16-bit instruction that contains information about the packet, such as packet 110. With packet header 112, the least-significant four bits indicate the size of each of the four instructions (either 16 or 32-bits). Inner loop bit 132 and outer loop bit 132 may be used by a hardware looping mechanism of DSP 40 for marking packet 110 as the last in an inner or outer loop, respectively. The remaining bits 138 and 140, marked "–" in FIG. 6, may be reserved for future expansion, in the presented embodiment, and are preferably set to zero.

In the presented embodiment, packet header 112 architecturally limits the maximum number of instructions in a packet to four. However, various ISA 70 versions may specify a 32-bit packet header which supports much wider issue.

When instructions are included in packet 110, the "00" continuation pattern in the halfword MSBs is redundant information. This "00" marker is distinguishing between 16 and 32-bit instructions, which is the same information that is in the packet header. This fact is exploited by recycling the "00" pattern within a packet. For packetized instructions, the "00" pattern is used to encode 16-bit instructions that are only available inside a packet.

The present embodiment overcomes the size delineation problem of serial analysis, because packet header 112 bits specify the instruction size. The present embodiment overcomes the packet delineation problem of prior approaches by use of the header bits 94 and 100 for specifying the individual instruction size, which bits also permit determining the total packet size. The present embodiment also provides additional flexibility in that more information may be inserting into each instruction.

In summary, the disclosed subject matter provides a method and a system for encoding and processing instructions of mixed lengths (e.g., 16 bits and 32 bits). The method includes the steps of and the system includes the instructions and related structures for encoding a plurality of instructions of a first length 92 (e.g., 16 bits) and a plurality of instructions of a second length 98 (e.g., 32 bits). The method and system encode a header 94 and 100 having at least one instruction length bit. The instruction bit distinguishes between the instructions of the first length 92 and the instructions of the second length 98. DSP 40 processes the instructions in a mixed stream of instructions of the first length 92 and the instructions of the second length 98. The method and system distinguish between each of the instructions of the first length 92 and the instructions of the second length 98 according to the contents of the instruction length bits 94 and 100.

The disclosed subject matter further includes specified bits in the header for designating the instructions in a packet. Thus, by including such bits in the header, the method and system can specify or distinguish between instructions of varying lengths as well as the number of such instructions in an instruction packet. As such, here appears a method and system that not only avoids the problems associated with serially determining the size of mixed length instructions, but also provides for efficient packet delineation in a DSP capable of supporting many different wireless handset applications.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method, comprising:

formulating an instruction packet including a packet header and at least a first instruction and a second instruction;

setting at least a first bit in the packet header to indicate a first instruction length of the first instruction;

setting at least a second bit in the packet header to indicate a second instruction length of the second instruction;

wherein the second instruction is selected from a class of instructions that are only available inside packets and the first instruction is not selected from the class of instructions that are only available inside packets;

wherein the first instruction includes at least a third bit to indicate the first instruction length;

wherein the second instruction length is different from the first instruction length;

wherein the second instruction includes an instruction length indicator field that has a value associated with the first instruction length; and wherein the value associated with the first instruction length indicates one instruction when the second instruction is received independent of a packet but indicates a different instruction having a different length than the one instruction when the second instruction is received within a packet.

2. The method of claim 1, further comprising transmitting an instruction stream including the instruction packet.

3. The method of claim 2, further comprising transmitting the first instruction in the instruction stream independent of the instruction packet.

4. The method of claim 1, wherein the one instruction is a 32-bit instruction and the different instruction is a 16-bit instruction.

5. A computer usable medium having computer readable program code means embodied therein for processing instructions on digital signal processor, the computer usable medium comprising:

computer readable program code for formulating an instruction packet including a packet header and at least a first instruction and a second instruction;

computer readable program code for setting at least a first bit in the packet header to indicate a first instruction length of the first instruction;

computer readable program code for setting at least a second bit in the packet header to indicate a second instruction length of the second instruction;

wherein the second instruction are selected from a set of instructions that are only available inside packets and the first instruction is not selected from the class of instructions that are only available inside packets;

wherein the first instruction includes at least a third bit to indicate the first instruction length;

wherein the second instruction length is different from the first instruction length;

wherein the second instruction includes an instruction length indicator field that has a value associated with the first instruction length; and wherein the value associated with the first instruction length indicates one instruction when the second instruction is received independent of a packet but indicates a different instruction, having a different length than the one instruction when the second instruction is received within a packet.

6. The computer usable medium of claim 5, further comprising computer readable program code for transmitting an instruction stream including the instruction packet.

7. The computer usable medium of claim 6, further comprising computer readable program code for transmitting the first instruction in the instruction stream independent of the instruction packet.

8. The computer usable medium of claim 5, wherein the one instruction is a 32-bit instruction and the different instruction is a 16-bit instruction.

9. A processor having a memory comprising:

means for receiving an instruction packet including a packet header and at least a first instruction and a second instruction;

means for setting at least a first bit in the packet header to indicate a first instruction length of the first instruction;

means for setting at least a second bit in the packet header to indicate a second instruction length of the second instruction;

wherein the second instruction is selected from a class of instructions that are only available inside packets and the first instruction is not selected from the class of instructions that are only available inside packets;

wherein the first instruction includes at least a third bit to indicate the first instruction length;

wherein the second instruction length is different from the first instruction length;

wherein the second instruction includes an instruction length indicator field that has a value associated with the first instruction length; and wherein the value associated with the first instruction length indicates one instruction when the second instruction is received independent of a packet but indicates a different instruction having a different length than the one instruction when the second instruction is received within a packet.

10. The processor of claim 9, further comprising computer readable program code for transmitting an instruction stream including the instruction packet.

11. The processor of claim 10, further comprising computer readable program code for transmitting the first instruction in the instruction stream independent of the instruction packet.

12. The processor of claim 9, wherein the one instruction is a 32-bit instruction and the different instruction is a 16-bit instruction.

\* \* \* \* \*

UNITED STATES PATENT AND TRADEMARK OFFICE
CERTIFICATE OF CORRECTION

| | | |
|---|---|---|
| PATENT NO. | : 7,526,633 B2 | Page 1 of 1 |
| APPLICATION NO. | : 11/088607 | |
| DATED | : April 28, 2009 | |
| INVENTOR(S) | : Codrescu et al. | |

It is certified that error appears in the above-identified patent and that said Letters Patent is hereby corrected as shown below:

Column 9, line 37, claim 5: "are selected" to read as --is selected--

Signed and Sealed this
Twenty-eighth Day of June, 2011

David J. Kappos
*Director of the United States Patent and Trademark Office*